(12) United States Patent
Ikarashi et al.

(10) Patent No.: US 9,860,058 B2
(45) Date of Patent: Jan. 2, 2018

(54) SECRET COMPUTATION SYSTEM, ARITHMETIC UNIT, SECRET COMPUTATION METHOD AND PROGRAM

(71) Applicant: NIPPON TELEGRAPH AND TELEPHONE CORPORATION, Chiyoda-ku (JP)

(72) Inventors: Dai Ikarashi, Tokyo (JP); Ryo Kikuchi, Tokyo (JP); Koki Hamada, Tokyo (JP); Koji Chida, Tokyo (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 147 days.

(21) Appl. No.: 14/758,373

(22) PCT Filed: Jan. 16, 2014

(86) PCT No.: PCT/JP2014/050647
§ 371 (c)(1),
(2) Date: Jun. 29, 2015

(87) PCT Pub. No.: WO2014/112548
PCT Pub. Date: Jul. 24, 2014

(65) Prior Publication Data
US 2015/0358155 A1    Dec. 10, 2015

(30) Foreign Application Priority Data
Jan. 17, 2013    (JP) .................................. 2013-006690

(51) Int. Cl.
*H04L 9/08*     (2006.01)
*G06F 7/58*     (2006.01)
*G06F 21/71*    (2013.01)

(52) U.S. Cl.
CPC .............. *H04L 9/085* (2013.01); *G06F 7/582* (2013.01); *G06F 21/71* (2013.01); *H04L 2209/46* (2013.01)

(58) Field of Classification Search
CPC ..... H04L 9/085; H04L 2209/46; G06F 21/71; G06F 7/582
See application file for complete search history.

(56) References Cited

U.S. PATENT DOCUMENTS

2013/0182836 A1*  7/2013  Hamada .................. H04L 9/085
                                                      380/28
2013/0304780 A1*  11/2013  Ikarashi .................. H04L 9/085
                                                      708/250

(Continued)

OTHER PUBLICATIONS

Dia Ikarashi, et al., "An Extremely Efficient Secret-sharing-based Multi-Party Computation against Malicious Adversary," SCIS 2013, Jan. 22, 2013, pp. 1-9 (with English abstract).

(Continued)

*Primary Examiner* — Harunur Rashid
*Assistant Examiner* — Wayne An
(74) *Attorney, Agent, or Firm* — Oblon, McClelland, Maier & Neustadt, L.L.P.

(57) ABSTRACT

Each of at least three arithmetic units includes: a random number generator determining shared value [r] obtained by performing secret sharing of random number r; a randomizer using shared value $[a_0], \ldots, [a_{M-1}]$ obtained by performing secret sharing of value $a_0, \ldots, a_{M-1}$ and shared value [r] to generate randomized shared value $<a_0>, \ldots, <a_{M-1}>$ with shared values $[a_0], \ldots, [a_{M-1}]$ and $[a_0 r], \ldots, [a_{M-1} r]$ as a pair; a secret computator determining concealed function value $[F([a_0], \ldots, [a_{M-1}])]$ by executing function F including at least one secret operation while including randomized shared value $<f_i>$ of an operation target and an operation result depending on contents of (Continued)

1  SECRET COMPUTATION SYSTEM secret operation into checksum $C:=<f_0>, \ldots, <f_{\mu-1}>$; and a correctness prover verifying correctness of function value $[F([a_0], \ldots, [a_{M-1}])]$ based on shared value $[\emptyset]$ obtained by multiplying a sum total of shared values $[f_r]$ included in checksum C by shared value $[r]$ and shared value $[\psi]$ of a sum total of shared values $[f_r r]$ included in checksum C.

8 Claims, 4 Drawing Sheets

(56) References Cited

U.S. PATENT DOCUMENTS

| | | | | |
|---|---|---|---|---|
| 2013/0339728 | A1* | 12/2013 | Ikarashi | H04L 9/085 713/164 |
| 2015/0095648 | A1* | 4/2015 | Nix | H04W 52/0235 713/170 |
| 2016/0125396 | A1* | 5/2016 | Brickell | G06Q 20/367 705/67 |
| 2016/0321958 | A1* | 11/2016 | Ikarashi | G06F 21/60 |
| 2016/0330018 | A1* | 11/2016 | Miyata | G06F 21/45 |

OTHER PUBLICATIONS

Koji Chida, et al., "A Three-Party Secure Function Evaluation with Lightweight Verifiability Revisited," CSS2010, 2010, 6 pages (with English abstract).

Ronald Cramer, et al., "Share Conversion, Pseudorandom Secret-Sharing and Applications to Secure Computation," TCC, vol. 3378 of Lecture Notes in Computer Science, 2005, pp. 342-362.

Rosario Gennaro, et al., "Simplified Vss and Fast-track Multiparty Computations with Applications to Threshold Cryptography," PODC 98, ACM 1998, pp. 101-111.

Ivan Damgard, et al., "Scalable and Unconditionally Secure Multiparty Computation," CRYPTO, vol. 4622 of Lecture Notes in Computer Science, 2007, pp. 572-590.

Koki Hamada, et al., "A Random Permutation Protocol on Three-Party Secure Function Evaluation," CSS2010, 2010, 6 pages (with English abstract).

Dia Ikarashi, et al., "Actively Private and Correct MPC Scheme in t <n/2 from Passively Secure Schemes with Small Overhead," International Association for Cryptologic Research, https//eprint.iacr.org/2014/304, 37 pages.

International Search Report dated Feb. 18, 2014 in PCT/JP2014/050647 filed Jan. 16, 2014.

* cited by examiner

SECRET COMPUTATION SYSTEM, ARITHMETIC UNIT, SECRET COMPUTATION METHOD AND PROGRAM

TECHNICAL FIELD

The present invention relates to a secret computation technique, and in particular to a technique for performing computation while concealing data, and ensuring correctness of a computation result.

BACKGROUND ART

Conventionally, as a technique for performing computation including multiplication and addition while ensuring correctness of a computation result, in a state of concealing data, three-party secure function evaluation of Non-patent literature 1 exists. This is a protocol for bringing about a result of an arithmetic/logical operation by cooperative computation by three parties (three computation subjects) without restoring a shared input value. In the three-party secure function evaluation protocol, data is treated as a natural number smaller than a certain determined prime number p. When data is to be concealed, and the data is indicated by a, a is shared into three such that the following condition is satisfied.

$$a = a_0 + a_1 + a_2 \bmod p$$

Actually, random number $a_1$ and $a_2$ are generated, and $a_0 = a - a_1 - a_2$ is obtained. Then, $(a_0, a_1)$, $(a_1, a_2)$ and $(a_2, a_0)$ are transmitted to three parties X, Y and Z, respectively. Then, though none of X, Y and Z has information about a because $a_1$ and $a_2$ are random numbers, a can be restored if any two parties gather.

Since concealment is additive sharing, the same result is obtained irrespective of whether the shared values are restored after being added or added after being restored, due to commutativity of the concealment. That is, an addition and a constant multiplication can be performed without communication in a shared state. Further, a multiplication is also possible though communication and random number generation are required. Therefore, it is possible to configure a logical circuit and execute any computation. A specific example of the three-party secure function evaluation will be shown below. In the three-party secure function evaluation protocol, a computation result is a remainder of division by p. However, description of "mod p" will be omitted below for simplification of description.

(1) Restoration of Secret Data a Shared to X, Y and Z

X transmits $a_0$ to Y, and transmits $a_1$ to Z. Y transmits $a_1$ to Z, and transmits $a_2$ to X. Z transmits $a_2$ to X and transmits $a_0$ to Y.

If $a_2$ received from Y and $a_2$ received from Z correspond to each other, X computes $a_0+a_1+a_2$ to restore a. If $a_0$ received from X and $a_0$ received from Z correspond to each other, Y computes $a_0+a_1+a_2$ to restore a. If $a_1$ received from X and $a_1$ received from Y correspond to each other, Z computes $a_0+a_1+a_2$ to restore a.

(2) Secret Computation of c=a+b

It is assumed that data b is also concealed by $(b_0,b_1)$, $(b_1,b_2)$ and $(b_2,b_0)$ being shared to X, Y and Z, respectively, in a method similar to the case of data a.

At this time, X computes and records $(c_0,c_1)=(a_0+b_0,a_1+b_1)$, Y computes and records $(c_1,c_2)=(a_1+b_1,a_2+b_2)$, and Z computes and records $(c_2,c_0)=(a_2+b_2,a_0+b_0)$.

(3) Secret Computation of c=a+α (α: a Known Constant)

X computes and records $(c_0,c_1)=(a_0+\alpha,a_1)$, and Z computes and records $(c_2,c_0)=(a_2,a_0+\alpha)$. Y does not perform processing.

(4) Secret Computation of c=a*α

X computes and records $(c_0,c_1)=(a_0*\alpha,a_1*\alpha)$, Y computes and records $(c_1,c_2)=(a_1*\alpha,a_2*\alpha)$, and Z computes and records $(c_2,c_0)=(a_2*\alpha,a_0*\alpha)$.

(5) Secret Computation of c=a*b (A Multiplication Without Detection of Illegality)

First, X generates random numbers $r_1$, $r_2$ and $c_0$, computes $c_1=(a_0+a_1)(b_0+b_1)-r_1-r_2-c_0$, and transmits $(r_1,c_1)$ and $(r_2,c_0)$ to Y and Z, respectively.

Next, Y computes $y=a_1*b_2+b_1*a_2+r_1$ and transmits y to Z. Further, Z computes $z=a_2*b_0+b_0*a_2+r_2$ and transmits z to Y.

Next, each of Y and Z computes $c_2=y+z+a_2*b_2$.

Then, X records $(c_0,c_1)$, Y records $(c_1,c_2)$, and Z records $(c_2,c_0)$.

(6) Secret Computation of c=a*b (A Multiplication with Detection of Illegality)

After the multiplication of c=a*b is performed by the method of (5) above, the following process is performed for each of X, Y and Z. In the following process, P means each of X, Y and Z. If P is X, $P_-$ and $P_+$ means Z and Y, respectively. If P is Y, $P_-$ and $P_+$ means X and Z, respectively. If P is Z, $P_-$ and $P_+$ means Y and X, respectively.

First, only $P_-$ and $P_+$ generate and share a random number r, and $P_-$ and $P_+$ distribute $r*a_0$, $r*a_1$ and $r*a_2$ to the respective parties as secret values of r*a. Next, c'=(r*a)*b is computed by the method of (5) above. Then, it is checked whether r*c-c' is 0 or not, illegality is detected if r*c-c' is not 0.

PRIOR ART LITERATURE

Non-Patent Literature

[Non-patent literature 1] Koji Chida, Koki Hamada, Dai Ikarashi and Katsumi Takahashi, "A Three-Party Secure Function Evaluation with Lightweight Verifiability Revisited", CSS2010, 2010

SUMMARY OF THE INVENTION

Problems to be Solved by the Invention

In conventional secret computation techniques for ensuring correctness of a computation result, there is a problem that it is not possible to select a security parameter. In the above conventional techniques, unit data targeted by computation is specified as a ring R, and the security parameter is uniquely specified by the ring R. For example, when R={0,1} is specified to compute a logical circuit, the security parameter is 2. In this case, it means that correctness of a computation result can be ensured only with a probability of 1/2.

An object of this invention is to provide a secret computation technique capable of arbitrarily setting a security parameter and lowering the probability of success in falsification.

Means to Solve the Problems

In order to solve the above problem, a secret computation system of this invention comprises at least three arithmetic units. In this invention, M, m and i are integers equal to or larger than 1; $0 \leq m < M$ is satisfied; $\mu$ is the number of randomized shared values included in a checksum C; and $0 \leq i < \mu$ is satisfied.

The arithmetic unit comprises: a random number generating part determining a shared value [r] obtained by performing secret sharing of a random number r; a randomization part using a shared value $[a_0], \ldots, [a_{M-1}]$ obtained by performing secret sharing of a value $a_0, \ldots, a_{M-1}$ and the shared value [r] to compute a shared value $[a_0 r], \ldots, [a_{M-1} r]$ of an integrated value $a_0 r, \ldots, a_{M-1} r$ of the value $a_0, \ldots, a_{M-1}$ and the random number r and generate a randomized shared value $<a_0>, \ldots, <a_{M-1}>$ with the shared value $[a_0], \ldots, [a_{M-1}]$ and the shared value $[a_0 r], \ldots, [a_{M-1} r]$ as a pair; a secret computation part determining a concealed function value $[F([a_0], \ldots, [a_{M-1}])]$ by executing a function F including at least one secret operation while including a randomized shared value $<f_i>$ which is an operation target and an operation result depending on the contents of secret operation into the checksum $C:=<f_0>, \ldots, <f_{\mu-1}>$; and a correctness proving part verifying correctness of the function value $[F([a_0], \ldots, [a_{M-1}])]$ on the basis of a shared value $[\varnothing]$ obtained by multiplying a sum total of shared values $[f_i]$ included in the checksum C by the shared value [r] and a shared value $[\psi]$ which is a sum total of shared values $[f_i r]$ included in the checksum C.

Effects of the Invention

According to a secret computation technique of this invention, it is possible to perform secret computation under a lower probability of success in falsification than before. Further, efficiency of proving correctness has been improved more than before, and it is possible to detect falsification at a high speed.

DETAILED DESCRIPTION OF THE EMBODIMENT

Figure 1:
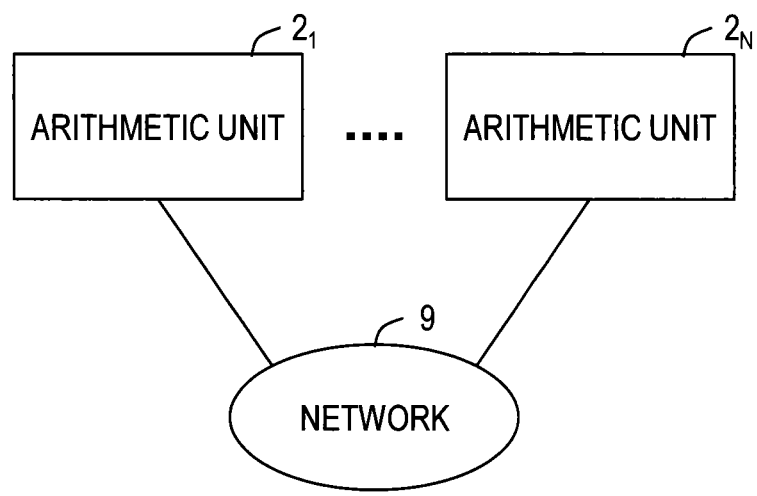
FIG. 1 is a diagram illustrating a functional configuration of a secret computation system.

Prior to description of an embodiment, description will be made on a method of expression in this specification and a fundamental way of thinking of this invention.
<Method of Expression>
Values handled in this invention are assumed to be values on R unless otherwise stated. R is a ring. A is an associative algebra on R. The associative algebra is an associative ring and is provided with such a structure of a linear space on some field that is compatible therewith. The associative algebra can be said to be such that a value handled in a vector space may be not a field but a ring.
The i-th element of a vector X is referred to with $X_i$ (subscript).
Here, [x] is a secret sentence of a value $x \in R$. A secret sentence is a value obtained by concealing a value by means such as encryption and secret sharing. If X is a set, [X] is a set in which each element of the set X is concealed.
Here, |X| is the number of elements of the set X.

Here, $<x>$ is a randomized shared value of the value $x \in R$. A randomized shared value is a pair of the shared value [x] and a shared value [xr] of an integrated value xr of the value x and a random number $r \in A$. Therefore, the randomized shared value can be defined like the following Formula (1).

[Formula 1]

$$<x> := ([x], [xr]) \in [R] \times [A] \qquad (1)$$

The 0-th component ([x] in Formula (1)) and the 1st component ([xr] in Formula (1)) of the randomized shared value are also referred to as an R component and an A component, respectively.

A space of a randomized shared value with the random number $r \in A$ as a parameter is assumed to be $<Rr>$.
<Security>
In the technical field of theory of cryptograph, a user/participant and an attacker are modeled in order to prove security of a protocol. As such models, a malicious model and a semi-honest model are used. In the malicious model, an attacker performs an arbitrary illegal action. In the semi-honest model, processing performed by an attacker is legal, and the attacker attempts to stealthily look at data within the legality. Therefore, a protocol for which security is proved in the malicious model can be evaluated for a higher security.

The conventional secret computation technique described in Non-patent literature 1 is secure in the semi-honest model. In the malicious model, however, secrecy is not ensured though correctness of a computation result is ensured. This invention realizes secure secret computation in the malicious model with a higher security, using secret computation which is secure in the semi-honest model.
<Points of Invention>
In conventional secret computation techniques, correctness is proved by performing an operation on the ring R by four systems. In this invention, correctness is proved by two systems, an operation on the ring R and an operation on an associative algebra A.

In conventional secret computation, it is possible to efficiently perform processing only on the same ring R. In the case of an operation on the associative algebra A, however, it is possible to perform processing while keeping upper compatibility with elements of the ring R, with efficiency equal to that of an operation on the ring R. An extended field, which is an algebraic structure belonging to an associative algebra, is an ideal algebraic structure from the viewpoint of security because results of a multiplication by random numbers are uniformly distributed.

In this invention, a shared value on the ring R is caused to be a randomized shared value with the use of a random number on the associative algebra A, and correctness is provide by two systems, an operation on the ring R and an operation on the associative algebra A. Therefore, by setting the associative algebra A in an appropriate space, a security parameter can be arbitrarily set. Thus, it is possible to perform secret computation under a lower probability of success in falsification than before.

Embodiment

An embodiment of this invention will be described below in detail. In drawings, components having the same functions are given the same reference numbers, and overlapped description will be omitted.
<Configuration>
A configuration example of a secret computation system 1 of this embodiment will be described with reference to FIG. 1. The secret computation system 1 comprises N (N≥3) arithmetic units $2_1, \ldots, 2_N$. Each of the N arithmetic units $2_1, \ldots, 2_N$ is connected to a network 9. The network 9 only has to be configured such that each connected unit is mutually communicable and can be configured, for example, with the Internet, a LAN (Local Area Network), a WAN (Wide Area Network) or the like. Each unit is not necessarily required to be communicable on line via the network. For example, such a configuration may be made that information to be inputted to the arithmetic units $2_1, \ldots, 2_N$ is stored into a portable recording medium, such as a magnetic tape and a USB memory, and inputted from the portable recording medium to the arithmetic units $2_1, \ldots, 2_N$ off-line.

Figure 2:
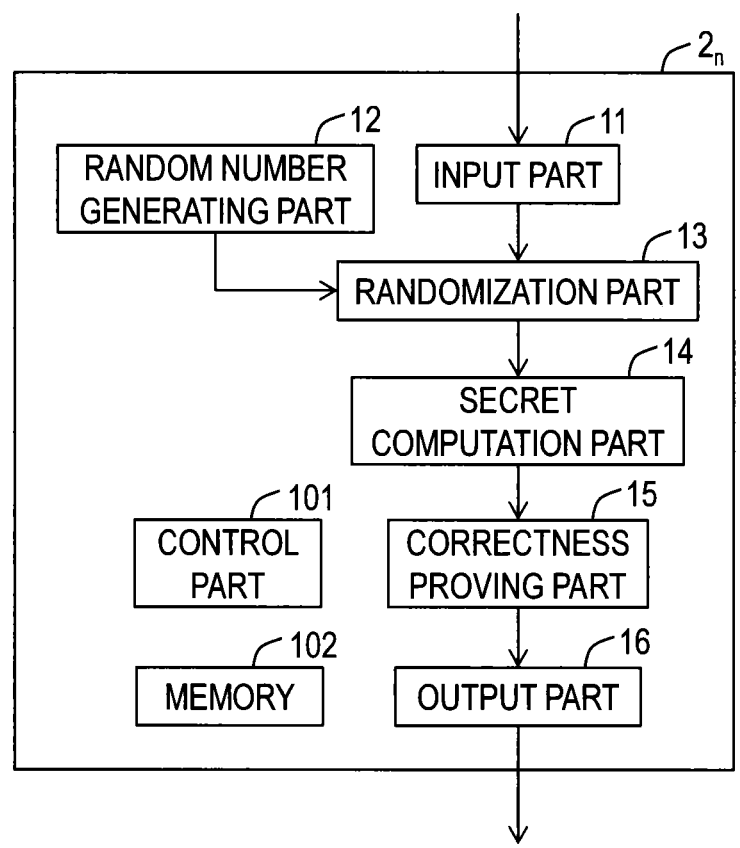
FIG. 2 is a diagram illustrating a functional configuration of an arithmetic unit.

A configuration example of an arithmetic unit $2_n$ (1≤n≤N) included in the secret computation system 1 will be described with reference to FIG. 2. The arithmetic unit $2_n$ comprises a control part 101, a memory 102, an input part 11, a random number generating part 12, a randomization part 13, a secret computation part 14, a correctness proving part 15 and an output part 16. The arithmetic unit $2_n$ is, for example, a special apparatus configured by a special program being read into a well-known or dedicated computer having a CPU (Central Processing Unit), a RAM (Random Access Memory) and the like. The arithmetic unit $2_n$ executes each process under the control of the control part 101. Data inputted to the arithmetic unit $2_n$ or data obtained by each process is stored into the memory 102, and the data stored into the memory 102 is read and used for other processes as necessary.

Figure 3:
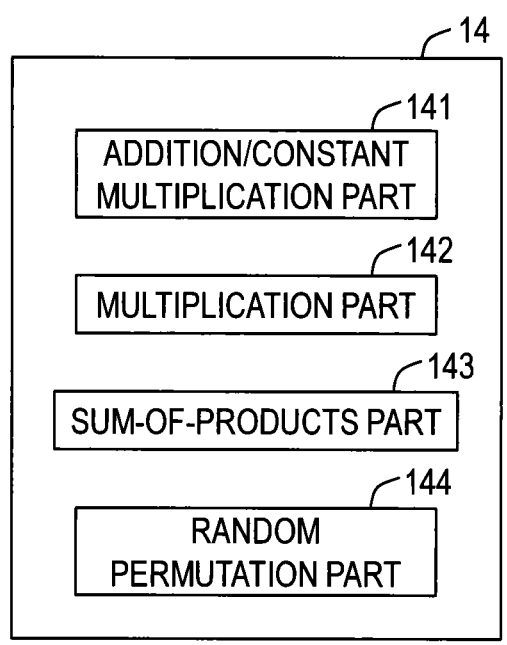
FIG. 3 is a diagram illustrating a functional configuration of a secret computation part.

A configuration example of the secret computation part 14 included in the arithmetic unit $2_n$ will be described with reference to FIG. 3. The secret computation part 14 comprises an addition/constant multiplication part 141, a multiplication part 142, a sum-of-products part 143 and a random permutation part 144. The secret computation part 14 controls each component to execute desired computation.

<Secret Computation Process>

Figure 4:
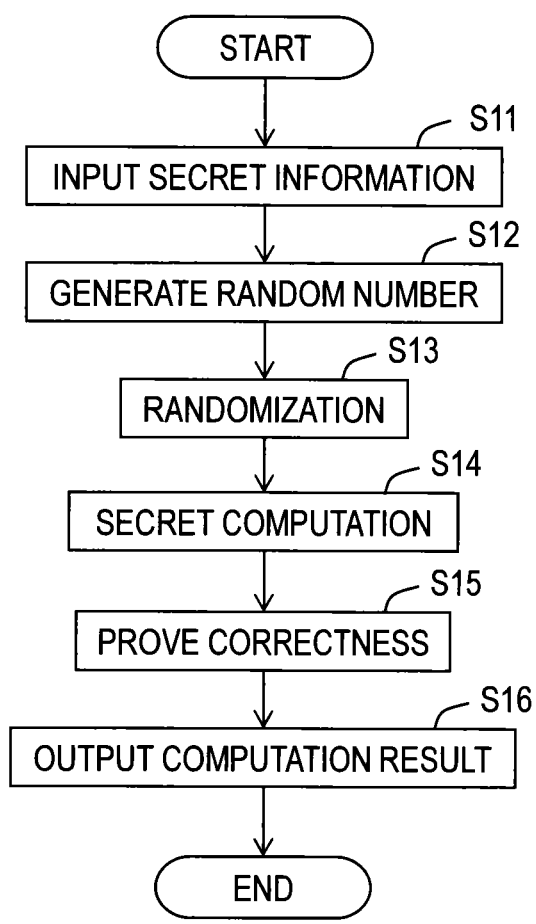
FIG. 4 is a diagram illustrating a process flow of a secret computation method.

An operation example of the secret computation system 1 of this embodiment will be described in detail in accordance with a procedure flow with reference to FIG. 4.

At least one shared value $[a_0], \ldots, [a_{M-1}]$ (M≥1) is inputted to the input part 11 which the arithmetic unit $2_n$ (1≤n≤N) is provided with (step S11). The inputted shared value $[a_0], \ldots, [a_{M-1}]$ is outputted to the randomization part 13. A shared value $[a_m]$ (0≤m<M) is a shared value obtained by performing secret sharing of a value $a_m$. Though a method for the secret sharing is required to be a secret sharing system in which each operation of an addition, a multiplication, a sum of products and random permutation is possible in secret computation, any secret sharing scheme may be adopted if these operations are possible. See Non-patent literature 1 for details about an applicable secret sharing method. The number M of shared values $[a_0], \ldots, [a_{M-1}]$ to be inputted is decided appropriately on the basis of the contents of secret computation performed by the secret computation part 14.

The random number generating part 12 generates a shared value [r] of a random number r∈A selected from the associative algebra A. The generated shared value [r] is outputted to the randomization part 13. Generation of the shared value [r] must be performed in a state that the random number r is concealed from any of the arithmetic units $2_1, \ldots, 2_N$.

For example, the arithmetic units $2_1, \ldots, 2_N$ constituting the secret computation system 1 can generate the shared value [r] of the random number r in cooperation with one another. Specifically, each arithmetic unit $2_n$ generates a random number $r_n$ first. Next, a shared value $[r_n]$ of the random number $r_n$ is generated by the concealment method described in Non-patent literature 1. Then, each arithmetic unit $2_n$ computes $[r]=\Sigma_{n<N}[r_n]$ to obtain the shared value [r] of the random number r. If such a configuration is made, all the arithmetic units $2_1, \ldots, 2_N$ can obtain the shared value [r] of the random number r without knowing the random number r.

Further, if it is possible to permit prior random number sharing or use of a pseudorandom number, it is possible to generate the shared value [r] of the random number r using replicated secret sharing. If replicated secret sharing is used, it is possible to generate the shared value [r] of the random number r without communication among the arithmetic units $2_1, \ldots, 2_N$. See "R. Cramer, I. Damgard, and Y. Ishai, "Share conversion, pseudorandom secret-sharing and applications to secure computation", TCC, Vol. 3378 of Lecture Notes in Computer Science, pp. 342-362, Springer, 2005 (Reference literature 1)" for details of replicated secret sharing.

The randomization part 13 generates a randomized shared value $<a_0>, \ldots, <a_{M-1}>$ using the shared value $[a_0], \ldots, [a_{M-1}]$ and the shared value [r] (step S13). The generated randomized shared value $<a_0>, \ldots, <a_{M-1}>$ is outputted to the secret computation part 14.

Specifically, for m=0, ..., M−1, the randomization part 13 determines $[a_m r]=[a_m]\times[r]$ by the secret computation method described in Non-patent literature 1, using the shared value $[a_m]$ and the shared value [r] and generates a randomized shared value $<a_m>=([a_m],[a_m r])$ with the shared value $[a_m]$ and the shared value $[a_m r]$ as a pair.

The secret computation part 14 executes a function F which includes at least one secret operation for the randomized shared value $<a_0>, \ldots, <a_{M-1}>$ to determine a concealed function value $[F([a_0], \ldots, [a_{M-1}])]$ (step S14). At this time, a randomized shared value $<f_i>$ to be an operation target and an operation result depending on the contents of a secret operation is included into a checksum $C:=<f_0>, \ldots, <f_{\mu-1}>$. Here, μ indicates the number of randomized shared values to be included into the checksum C. The value of is incremented each time the checksum C is updated. The determined function value $[F([a_0], \ldots, [a_{M-1}])]$ and the checksum C are outputted to the correctness proving part 15.

In the case where secret computation for an addition/constant multiplication is performed in the function F, the secret computation part 14 performs the secret computation by the addition/constant multiplication part 141. Because a randomized shared value has additive homomorphism, the secret computation for an addition/constant multiplication can be executed without communicating with the other the arithmetic units $2_n$, similarly to an addition for a shared value on the ring R.

Specifically, a randomized shared value <γa+b> is computed by the following Formula (2) on the assumption that each of randomized shared values <a> and <b> is any of the randomized shared values $<a_0>, \ldots, <a_{M-1}>$ or a randomized shared value outputted from each component included in the secret computation part 14, and γ is an arbitrary constant. If an R component [γa+b] of the randomized shared value <γa+b> as a computation result is included among the function values $[F([a_0], \ldots, [a_{M-1}])]$, the randomized shared value <γa+b> is included into the checksum C by Formula (3). As for secret computation for an addition/constant multiplication, since the secret computation can be realized by an operation inside an arithmetic unit, update of the checksum C by a randomized shared value before the operation is not performed.

[Formulas 2]

$$\langle \gamma a+b \rangle := (\gamma[a]+[b], \gamma[ar]+[br]) \quad (2)$$

$$C := C \cup \langle \gamma a+b \rangle \quad (3)$$

In the case of performing secret computation for a multiplication in the function F, the secret computation part 14 performs the secret computation by the multiplication part 142. The secret computation for a multiplication is realized by a multiplication on the ring R and a scalar multiplication.

Specifically, the checksum C is updated by the following Formula (4), and a randomized shared value $\langle ab \rangle$ is computed by Formula (5), on the assumption that each of the randomized shared values $\langle a \rangle$ and $\langle b \rangle$ is any of the randomized shared values $\langle a_0 \rangle, \ldots, \langle a_{M-1} \rangle$ or a randomized shared value outputted from each component included in the secret computation part 14. If an R component [ab] of the randomized shared value $\langle ab \rangle$ as a computation result is included among the function values $[F([a_0], \ldots, [a_{M-1}])]$, the randomized shared value $\langle ab \rangle$ is included into the checksum C by Formula (6).

[Formulas 3]

$$C := C \cup \{\langle a \rangle, \langle b \rangle\} \quad (4)$$

$$\langle ab \rangle := ([a][b], [a][br]) \quad (5)$$

$$C := C \cup \langle ab \rangle \quad (6)$$

In secret computation for a multiplication, [ar], which is an A component, is not used for the randomized shared value $\langle a \rangle$. If [ar][br] are computed, $[abr^2]$ is obtained, and the degree of the random number r changes. In order to avoid this, [a][br]=[abr] is computed for the A component.

For a multiplication on the ring R, a method described in "R. Gennaro, M. O. Rabin, and T. Rabin, "Simplified VSS and fast-track multiparty computations with applications to threshold cryptography", PODC, pp. 101-111, ACM, 1998 (Reference literature 2)" or "I. Damgard and J. B. Nielsen, "Scalable and unconditionally secure multiparty computation", CRYPTO, Vol. 4622 of Lecture Notes in Computer Science, pp. 572-590, Springer, 2007 (Reference literature 3)" can be applied. When the total number of the arithmetic units $2_n$ is indicated by n, and the number of arithmetic units $2_n$ required for restoration is indicated by k, one round of traffic $O(n^2)$ is conducted in the method described in Reference literature 2, while three rounds of traffic $O(n)$ are conducted in the method described in Reference literature 3. Therefore, the method described in Reference literature 2 is more excellent from the viewpoint of traffic. More accurately, however, the traffic is n(n−1) in the method described in Reference literature 2, and the traffic is n(n−1)/k+6(n−1) in the method described in Reference literature 3. Therefore, when n is small, there may be a case where the method described in Reference literature 2 is more efficient.

As for a multiplication on the associative algebra A, since A is a ring, a semi-honest multiplication can be performed without a problem if replicated secret sharing is used. Further, if A is a field, it does not matter even if Shamir's secret sharing is used. When A is not a field in the case of using Shamir's secret sharing, it is not obvious whether it does not matter. If A is merely $R^q$, however, it is only necessary to perform a multiplication on R for each component.

A scalar multiplication is an operation for computing $[ab] \in [A]$ from $[a] \in [R]$, $[b] \in [A]$. If A is expressed as a q-dimensional vector of R' relative to the ring homomorphism R' of R, the scalar multiplication is easy. A homomorphism of R→R' is indicated by h, and $[b]=([b_0], \ldots, [b_{q-1}])$ is assumed. If [h(a)] is assumed to be obtained by causing h to act on each party's share of [a], [h(a)] belongs to [R'] because of the homomorphism. That is, $[ab]:=([h(a)][b_0], \ldots, [h(a)][b_{q-1}])$ is obtained. Because h is a local computation, traffic corresponds to q multiplications on R' (or one multiplication on A), and the number of rounds is one. The case of A being an extended field is the simplest case of satisfying this condition. In this case, h can be an identical map, and $[ab]:=([a][b_0], \ldots, [a][b_{q-1}])$ is obtained.

In the case of performing secret computation for a sum of products in the function F, the secret computation part 14 performs the secret computation by the sum-of-products part 143. The secret computation for a sum of products is realized by a sum of products on the ring R and a scalar sum of products.

Specifically, the checksum C is updated by the following Formula (7), and a randomized shared value $\langle \Sigma_{i<L} \alpha_i \beta_i \rangle$ is computed by Formula (8), on the assumption that L is an integer between 2 and M including 2 and M, and each of randomized shared values $\langle \alpha_0 \rangle, \ldots, \langle \alpha_{L-1} \rangle$ and $\langle \beta_0 \rangle, \ldots, \langle \beta_{L-1} \rangle$ is any of the randomized shared values $\langle a_0 \rangle, \ldots, \langle a_{M-1} \rangle$ or a randomized shared value outputted from each component included in the secret computation part 14. If an R component $[\Sigma_{i<L} \alpha_i \beta_i]$ of the randomized shared value $\langle \Sigma_{i<L} \alpha_i \beta_i \rangle$ as a computation result is included among the function values $[F([a_0], \ldots, [a_{M-1}])]$, the randomized shared value $\langle \Sigma_{i<L} \alpha_i \beta_i \rangle$ is included into the checksum C by a Formula (9).

[Formulas 4]

$$C := C \cup \{\langle \alpha_i \rangle\}_{0 \leq i < L} \cup \{\langle \beta_i \rangle\}_{0 \leq i < L} \quad (7)$$

$$\left\langle \sum_{i<L} \alpha_i \beta_i \right\rangle := \left( \sum_{i<L} [\alpha_i][\beta_i], \sum_{i<L} [\alpha_i][\beta_i r] \right) \quad (8)$$

$$C := C \cup \left\langle \sum_{i<L} \alpha_i \beta_i \right\rangle \quad (9)$$

A sum of products on the ring R can be realized with the use of a multiplication on the ring R. Traffic of a sum of products on the ring R is the same as traffic of one multiplication on the ring R. A scalar sum of products can be realized with a scalar multiplication. Traffic of a scalar sum of products is the same as traffic of one scalar multiplication. It is because of a reason similar to that of the multiplication part 142 of avoiding change in the degree of the random number r that $[\alpha_i r]$, which is an A component, is not used for a randomized shared value $\langle \alpha_i \rangle$.

In the case of performing secret computation for random permutation in the function F, the secret computation part 14 performs the secret computation by the random permutation part 144. In random permutation for a randomized shared value, the same random permutation is performed for an R component and an A component of the randomized shared value.

Specifically, the checksum C is updated by the following Formula (10), and a randomized shared value $\langle \alpha_{\pi(i)} \rangle$ is computed by Formulas (11) and (12), on the assumption that L is an integer between 2 and M including 2 and M, each of $\langle \alpha_0 \rangle, \ldots, \langle \alpha_{L-1} \rangle$ is any of the randomized shared values $\langle a_0 \rangle, \ldots, \langle a_{M-1} \rangle$ or a randomized shared value outputted from each component included in the secret computation part 14, and π is a map to a set of integers equal to or larger than 0 and smaller than L. If an R component $[\alpha_{\pi(i)}]$ of the randomized shared value $<\alpha_{\pi(i)}>$ as a computation result is included among the function values $[F([a_0], \ldots, [a_{M-1}])]$, the randomized shared value $<\alpha_{\pi(i)}>$ is included into the checksum C by Formula (13).

[Formulas 5]

$$C := C \cup \{<\alpha_i>\}_{0 \leq i < L} \quad (10)$$

$$\{([\alpha_{\pi(i)}])\}_{0 \leq i < L}, \{([\alpha_{\pi(i)}r])\}_{0 \leq i < L} \quad (11)$$

$$\{<\alpha_{\pi(i)}>\}_{0 \leq i < L} := \{([\alpha_{\pi(i)}], [\alpha_{\pi(i)}r])\}_{0 \leq i < L} \quad (12)$$

$$C := C \cup \{<\alpha_{\pi(i)}>\}_{0 \leq i < L} \quad (13)$$

1 Compute . . .

A method described in "Koki Hamada, Dai Ikarashi, Koji Chida and Katsumi Takahashi, "A Random Permutation Protocol on Three-Party Secure Function Evaluation", CSS2010, 2010 (Reference literature 4)" can be applied to the secret computation for random permutation.

The correctness proving part 15 proves correctness of the function value $[F([a_0], \ldots, [a_{M-1}])]$ by verifying the checksum C using the shared value [r] (step S15). If it is judged that falsification has not been made, as a result of verifying the checksum C, the function value $[F([a_0], \ldots, [a_{M-1}])]$ is outputted to the output part 16. If it is judged that falsification has been made, information showing that effect (for example, "⊥") is outputted to the output part 16. The verification of the checksum C is performed on the basis of a shared value [Ø] obtained by multiplying the sum total of shared values $[f_0], \ldots, [f_{\mu-1}]$ included in the checksum C by the shared value [r] and a shared value [ψ], which is the sum total of shared values $[f_0r], \ldots, [f_{\mu-1}r]$ included in the checksum C.

Specifically, the correctness proving part 15 verifies the checksum C, for example, as shown below. First, shared values $[\rho_0], \ldots, [\rho_{\mu-1}]$ of μ random numbers $\rho_0, \ldots, \rho_{\mu-1}$ on the associative algebra A are generated. The generation of the shared values $[\rho_0], \ldots, [\rho_{\mu-1}]$ must be performed in a state that the random numbers $\rho_0, \ldots, \rho_{\mu-1}$ are concealed from any of the arithmetic unit $2_n$. The generation of the shared values $[\rho_0], \ldots, [\rho_{\mu-1}]$ can be performed in a method similar to that of the random number generating part 12.

Next, the shared value [Ø] is determined from the following Formula (14) with the use of the shared values $[f_0], \ldots, [f_{\mu-1}]$, shared values $[\rho_0], \ldots, [\rho_{\mu-1}]$ and shared value [r] included in the checksum C.

[Formula 6]

$$[\varphi] := \left( \sum_{i < \mu} [f_i][\rho_i] \right)[r] \quad (14)$$

Further, the shared value [ψ] is determined from the following Formula (15) with the use of the shared values $[f_0r], \ldots, [f_{\mu-1}r]$ and shared values $[\rho_0], \ldots, [\rho_{\mu-1}]$ included in the checksum C.

[Formula 7]

$$[\psi] := \sum_{i < \mu} [f_i r][\rho_i] \quad (15)$$

Then, a shared value [δ]=[Ø]−[ψ] obtained by subtracting the shared value [ψ] from the shared value [Ø] is restored. As for a method for the restoration, a restoration operation of a secret sharing scheme corresponding to each shared value can be used. At this time, correctness is ensured by the malicious model. Specifically, complete correctness is ensured by all the arithmetic units $2_1, \ldots, 2_N$ mutually transmitting the shared value [δ] to the other arithmetic units and confirming consistency in the shared values. In this case, when the total number of the arithmetic units $2_n$ is indicated by n, and the number of arithmetic units $2_n$ required for restoration is indicated by k, the total traffic is n(n−1). At this time, if a stochastic method is used, it is possible to cause the total traffic to be n(k−1) when the amount of data of the shared values are large. There is a semi-honest operation which includes such restoration that does not ensure correctness, like the secret computation described in Reference literature 3 described above. However, if such restoration that does not ensure correctness is included as a component of secret computation, it does not effect security of the whole secret computation.

If the restored value δ is 0 in all the arithmetic units $2_1, \ldots, 2_N$, it is judged that falsification has not been made through the whole secret computation. If the restored value δ is not 0 in any of the arithmetic units $2_1, \ldots, 2_N$, it is judged that falsification has been made in the secret computation.

A fundamental way of thinking of proving correctness will be described. When attention is paid to each randomized shared value, verification of a checksum is to verify whether $[f_i][r]-[f_ir]=0$ is satisfied. Here, if the case where both of the shared value $[f_i]$ and the shared value $[f_ir]$ have been falsified to be $[f_i+x]$ and $[f_ir+y]$ is considered, a value obtained by verification is as shown by Formula (16).

[Formula 8]

$$[f_i+x][r]-[f_ir+y]=[xr-y] \quad (16)$$

An attacker has to cope with operating $[f_i]$ and $[f_ir]$ so that the value of xr−y becomes 0. However, since the attacker does not know the random number r∈A, the probability of being able to satisfy that is 1/|A|. In this embodiment, however, the probability of success in falsification of the whole is 2/|A| at the most because multiplication by the random numbers $\rho_0, \ldots, \rho_{\mu-1}$ is performed.

The secret computation part 14 is not necessarily required to comprise all the addition/constant multiplication part 141, the multiplication part 142, the sum-of-products part 143 and the random permutation part 144. It is sufficient if each component corresponding to operations included in the function F to be executed is included without deficiency. For example, if the function F is for computing only constant multiplication and multiplication operations, the secret computation part 14 only has to comprise the addition/constant multiplication part 141 and the multiplication part 142.

[Variation]

The ring R and the associative algebra A can be expressed as Z/pZ where Z indicates an integer ring, and p indicates a prime number. By making such a configuration, it is possible to cause the probability of success in falsification to be about 2/p. Further, it is possible to reduce the amount of data to be communicated among the arithmetic units in a secret operation.

The ring R can be expressed as Z/pZ and the associative algebra A can be expressed as a q-dimensional extended field of the ring R, where Z indicates an integer ring, p indicates a prime number, and q indicates an integer equal to or larger than 1. By making such a configuration, it is possible to cause the probability of success in falsification to be about $2/p^q$. When p is small, such as the case of R={0,1}, the configuration is especially effective.

The ring R is expressed as $Z/p^nZ$ and the associative algebra A can be expressed as $Z/p^mZ$ where Z indicates an integer ring, p indicates a prime number, and n and m indicate integers. By making such a configuration, it is possible to cause the probability of success in falsification to be about $2/p^q$.

[Program and Recording Medium]

It goes without saying that this invention is not limited to the embodiment described above and can be appropriately modified within a range not departing from the spirit of this invention. The various processes described in the above embodiment are not only to be executed in a time series in accordance with the described order but may be executed in parallel or separately according to throughputs of apparatuses which are to execute the processes or as necessary.

Further, in the case of realizing the various processing functions in each apparatus described in the above embodiment by a computer, the processing contents of the functions to be provided for each apparatus are written by a program. Then, by executing the program on the computer, the various processing functions in each apparatus described above are realized on the computer.

The program in which the processing contents are written can be recorded in a computer-readable recording medium. As the computer-readable recording medium, any recording medium, for example, a magnetic recording device, an optical disk, a magneto-optical recording medium, a semiconductor memory or the like is possible.

Further, distribution of this program is performed, for example, by selling, transferring or lending a portable recording medium, such as a DVD and a CD-ROM, in which the program is recorded. Furthermore, such a configuration is also possible that this program is stored in a storage device of a server computer and caused to be distributed by transferring the program from the server computer to other computers via a network.

For example, a computer which executes such a program, first stores the program recorded in a portable recording medium or transferred from a server computer into its storage device once. Then, at the time of executing a process, this computer reads the program stored in its recording medium and executes a process in accordance with the read program. Further, as other forms of executing this program, the computer may read the program directly from the portable recording medium and execute the process in accordance with the program. Furthermore, each time a program is transferred to this computer from the server computer, the computer may successively execute a process in accordance with the received program. Further, such a configuration is also possible that the above process is executed by a so-called ASP (Application Service Provider) type service in which the program is not transferred from the server computer to this computer, and the processing functions are realized only by instructing execution of the program and acquiring a result. It is assumed that the program in this embodiment includes information which is to be provided for processing by an electronic computer and is equivalent to a program (such as data which is not direct commands to a computer but has a nature of specifying processing by the computer).

Though it is assumed, in this embodiment, that the present apparatus is configured by causing a predetermined program to be executed on a computer, at least a part of the processing contents may be realized by hardware.

What is claimed is:

1. A secret computation system comprising at least three arithmetic devices units, wherein M is an integer equal to or larger than 1; m and i are integers equal to or larger than 0; $0 \le m < M$ is satisfied; R is a ring; A is an associative algebra on R; [x] denotes a shared value of a value $x \in R$ held by each of the arithmetic units; $\langle x \rangle := ([x], [xr])$ denotes a randomized shared value of a value $x \in R$ which is a pair of a shared value of the value x and a shared value of an integrated value of the value x and a random value $r \in A$ held by each of the arithmetic units; $\mu$ is the number of randomized shared values included in a checksum C; and $0 \le i < \mu$ is satisfied; and each of the arithmetic devices is connected to a common network and comprises:

circuitry configured to generate a shared value [r] obtained by performing secret sharing of a random number $r \in A$, wherein each random number $r \in A$ is generated separately in each arithmetic device as $r_n$ while being shared with each remaining arithmetic device as shared value $[r_n]$ to conceal the original value $r_n$ generated in each device, and each arithmetic device calculates the same shared value [r] based on a summation of the all shared values $[r_n]$ shared among the arithmetic units;

receive a shared value $[a_0], \ldots, [a_{M-1}]$ as an input obtained by performing secret sharing of a value $a_0, \ldots, a_{M-1} \in R$ and use the shared value $[a_0], \ldots, [a_{M-1}]$ and the shared value [r] to compute a shared value $[a_0 r], \ldots, [a_{M-1} r]$ based on $[a_m r] = [a_m] \times [r]$, which represents an integrated value $a_0 r, \ldots, a_{M-1} r$ of the value $a_0, \ldots, a_{M-1}$ and the random number r and generate a randomized shared value $\langle a_0 \rangle, \ldots, \langle a_{M-1} \rangle$ with the shared value $[a_0], \ldots, [a_{M-1}]$ and the shared value $[a_0 r], \ldots, [a_{M-1} r]$ as a pair based on $\langle a_m \rangle := ([a_m], [a_m r])$;

generate a concealed function value $[F([a_0], \ldots, [a_{M-1}])]$ by executing a function F including at least one secret operation for the randomized share value $\langle a_0 \rangle, \ldots, \langle a_{M-1} \rangle$ while including a randomized shared value $\langle f_i \rangle := ([f_i], [f_i r])$ which is an operation target and an operation result depending on the contents of secret computation of the secret operation upon $\langle a_0 \rangle, \ldots, \langle a_{M-1} \rangle$, which is then input into the checksum $C := \langle f_0 \rangle, \ldots, \langle f_{\mu-1} \rangle := ([f_0], [f_0 r]), \ldots, ([f_{\mu-1}], [f_{\mu-1} r])$, wherein the circuitry of each arithmetic device includes a secret computation section which receives an input of the randomized shared value and which includes a plurality of separate and different mathematical operation portions, wherein the at least one secret operation is one of the plurality of separate and different mathematical operation portions that is selected within the respective arithmetic device;

verify correctness of the function value $[F([a_0], \ldots, [a_{M-1}])]$ on the basis of a shared value $[\emptyset]$ obtained by multiplying a sum total of shared values $[f_i]$ included in the checksum C by the shared value [r] and a shared value $[\psi]$ which is a sum total of shared values $[f_i r]$ included in the checksum C, wherein correctness is verified when $[\delta] = [\emptyset] - [\psi] = 0$ in all of the arithmetic devices connected to the network, $[\delta]$ being calculated separately and shared among all of the arithmetic devices connected to the network; and output the function value $[F([a_0], \ldots, [a_{M-1}])]$ when the correctness of the function value $[F([a_0], \ldots, [a_{M-1}])]$ is verified, and output an indication that falsification has occurred at one of the arithmetic devices connected to the network when the correctness of the function value $[F([a_0], \ldots, [a_{M-1}])]$ is not verified.

2. The secret computation system according to claim 1, wherein the circuitry of each of the arithmetic devices is configured to:

compute a randomized shared value $<\gamma a+b>:=(\gamma[a]+[b], \gamma[ar]+[br])$ and including the randomized shared value $<\gamma a+b>$ into the checksum C, wherein each of $<a>:=([a],[ar])$ and $<b>:=([b],[br])$ is any of the randomized shared values $<a_0>, \ldots, <a_{M-1}>$, and $\gamma$ is a constant.

3. The secret computation system according to claim 1, wherein the circuitry of each of the arithmetic devices is configured to:

include $<a>$ and $<b>$ into the checksum C, computing a randomized shared value $<ab>:=([a][b],[a][br])$ and including the randomized shared value $<ab>$ into the checksum C, wherein each of $<a>:=([a],[ar])$ and $<b>:=([b],[br])$ is any of the randomized shared values $<a_0>, \ldots, <a_{M-1}>$.

4. The secret computation system according to claim 1, wherein the circuitry of each of the arithmetic devices is configured to:

include $<\alpha_0>, \ldots, <\alpha_{L-1}>$ and $<\beta_0>, \ldots, <\beta_{L-1}>$ into the checksum C, computing a randomized shared value $<\Sigma_{i<L}\alpha_i\beta_i>:=(\Sigma_{i<L}[\alpha_i][\beta_i],\Sigma_{i<L}[\alpha_i][\beta_i r])$ and including the randomized shared value $<\Sigma_{i<L}\alpha_i\beta_i>$ into the checksum C, wherein L is an integer between 2 and M including 2 and M, and each of $<\alpha_0>:=([\alpha_0],[\alpha_0 r]), \ldots, <\alpha_{L-1}>:=([\alpha_{L-1}],[\alpha_{L-1}r])$ and $<\beta_0>:=([\beta_0],[\beta_0 r]), \ldots, <\beta_{L-1}>:=([\beta_{L-1}],[\beta_{L-1}r])$ is any of the randomized shared value $<a_0>, \ldots, <a_{M-1}>$.

5. The secret computation system according to claim 1, wherein the circuitry of each of the arithmetic devices is configured to:

include $<\alpha_0>, \ldots, <\alpha_{L-1}>$ into the checksum C, computing a randomized shared value $<\alpha_{\pi(i)}>:=([\alpha_{\pi(i)}],[\alpha_{\pi(i)}r])$ and including the randomized shared value $<\alpha_{\pi(i)}>$ into the checksum C, wherein L is an integer between 2 and M including 2 and M, each of $<\alpha_0>:=([\alpha_0],[\alpha_0 r]), \ldots, <\alpha_{L-1}>:=([\alpha_{L-1}],[\alpha_{L-1}r])$ is any of the randomized shared value $<a_0>, \ldots, <a_{M-1}>$, and $\pi$ is a map to a set of integers equal to or larger than 0 and smaller than L.

6. An arithmetic device, in a system that includes at least three arithmetic devices that are connected to a common network, wherein M is integer equal to or larger than 1; m and i are integers equal to or larger than 0; $0 \leq m < M$ is satisfied; R is a ring; A is an associative algebra on R; [x] denotes a shared value of a value $x \in R$ held by each of the arithmetic units; $<x>:=([x], [xr])$ denotes a randomized shared value of a value $x \in R$ which is a pair of a shared value of the value x and a shared value of an integrated value of the value x and a random value $r \in A$ held by each of the arithmetic devices; $\mu$ is the number of elements included in a checksum C; and $0 \leq i < \mu$ is satisfied, comprising:

circuitry configured to generate a shared value [r] obtained by performing secret sharing of a random number $r \in A$, wherein each random number $r \in A$ is generated separately in each arithmetic device as $r_n$ while being shared with each remaining arithmetic device as shared value $[r_n]$ to conceal the original value $r_n$ generated in each device, and each arithmetic device calculates the same shared value [r] based on a summation of the all shared values $[r_n]$ shared among the arithmetic devices;

receive a shared value $[a_0], \ldots, [a_{M-1}]$ as an input obtained by performing secret sharing of a value $a_0, \ldots, a_{M-1} \in R$ and use the shared value $[a_0], \ldots, [a_{M-1}]$ and the shared value [r] to compute a shared value $[a_0 r], \ldots, [a_{M-1}r]$ based on $[a_m r]=[a_m] \times [r]$, which represents an integrated value $a_0 r, \ldots, a_{M-1} r$ of the value $a_0, \ldots, a_{M-1}$ and the random number r and generate a randomized shared value $<a_0>, \ldots, <a_{M-1}>$ with the shared value $[a_0], \ldots, [a_{M-1}]$ and the shared value $[a_0 r], \ldots, [a_{M-1}r]$ as a pair based on $<a_m>:=([a_m],[a_m r])$;

generate a concealed function value $[F([a_0], \ldots, [a_{M-1}])]$ by executing a function F including at least one secret operation for the randomized share value $<a_0>, \ldots, <a_{M-1}>$ while including a randomized shared value $<f_i>:=([f_i], [f_i r])$ which is an operation target and an operation result depending on the contents of secret computation of the secret operation upon $<a_0>, \ldots, <a_{M-1}>$, which is then input into the checksum $C:=<f_0>, \ldots, <f_{\mu-1}>:=([f_0], [f_0 r]), \ldots, ([f_{\mu-1}], [f_{\mu-1}r])$, wherein the circuitry of each arithmetic device includes a secret computation section which receives an input of the randomized shared value and which includes a plurality of separate and different mathematical operation portions, wherein the at least one secret operation is one of the plurality of separate and different mathematical operation portions that is selected within the respective arithmetic device;

verify correctness of the function value $[F([a_0], \ldots, [a_{M-1}])]$ on the basis of a shared value $[\emptyset]$ obtained by multiplying a sum total of shared values $[f_i]$ included in the checksum C by the shared value [r] and a shared value $[\psi]$ which is a sum total of shared values $[f_i r]$ included in the checksum C, wherein correctness is verified when $[\delta]=[\emptyset]-[\psi]=0$ in all of the arithmetic devices connected to the network, $[\delta]$ being calculated separately and shared among all of the arithmetic devices connected to the network; and output the function value $[F([a_0], \ldots, [a_{M-1}])]$ when the correctness of the function value $[F([a_0], \ldots, [a_{M-1}])]$ is verified, and output an indication that falsification has occurred at one of the arithmetic devices connected to the network when the correctness of the function value $[F([a_0], \ldots, [a_{M-1}])]$ is not verified.

7. A secret computation method, implemented by a secret computation system comprising at least three arithmetic devices that are connected to a common network, wherein M, m and i are integers equal to or larger than 1; $0 \leq m < M$ is satisfied; R is a ring; A is an associative algebra on R; [x] denotes a shared value of a value $x \in R$ held by each of the arithmetic devices; $<x>:=([x], [xr])$ denotes a randomized shared value of a value $x \in R$ which is a pair of a shared value of the value x and a shared value of an integrated value of the value x and a random value $r \in A$ held by each of the arithmetic devices; $\mu$ is the number of elements included in a checksum C; and $0 \leq i < \mu$ is satisfied; and the method comprising:

by circuitry of each of the arithmetic devices:

generating a shared value [r] obtained by performing secret sharing of a random number r∈A, wherein each random number r∈A is generated separately in each arithmetic unit as $r_n$ while being shared with each remaining arithmetic device as shared value $[r_n]$ to conceal the original value $r_n$ generated in each unit, and each arithmetic device calculates the same shared value [r] based on a summation of the all shared values $[r_n]$ shared among the arithmetic devices;

receiving a shared value $[a_0], \ldots, [a_{M-1}]$ as an input obtained by performing secret sharing of a value $a_0, \ldots, a_{M-1} \in R$ and use the shared value $[a_0], \ldots, [a_{M-1}]$ and the shared value [r] to compute a shared value $[a_0 r], \ldots, [a_{M-1} r]$ based on $[a_m r] = [a_m] \times [r]$, which represents an integrated value $a_0 r, \ldots, a_{M-1} r$ of the value and the random number r and generate a randomized shared value $<a_0>, \ldots, <a_{M-1}>$ with the shared value $[a_0], \ldots, [a_{M-1}]$ and the shared value $[a_0 r], \ldots, [a_{M-1} r]$ as a pair based on $<a_m>:=([a_m],[a_m r])$;

generating a concealed function value $[F([a_0], \ldots, [a_{M-1}])]$ by executing a function F including at least one secret operation for the randomized share value $<a_0>, \ldots, <a_{M-1}>$ while including a randomized shared value $<f_i>:=([f_i], [f_i r])$ which is an operation target and an operation result depending on the contents of secret computation of the secret operation upon $<a_0>, \ldots, <a_{M-1}>$, which is then input into the checksum $C:=<f_0>, \ldots, <f_{\mu-1}>:=([f_0], [f_0 r]), \ldots, ([f_{\mu-1}], [f_{\mu-1} r])$, wherein the circuitry of each arithmetic device includes a secret computation section which receives an input of the randomized shared value and which includes a plurality of separate and different mathematical operation portions, wherein the at least one secret operation is one of the plurality of separate and different mathematical operation portions that is selected within the respective arithmetic device;

verifying correctness of the function value $[F([a_0], \ldots, [a_{M-1}])]$ on the basis of a shared value [Ø] obtained by multiplying a sum total of shared values $[f_i]$ included in the checksum C by the shared value [r] and a shared value [ψ] which is a sum total of shared values $[f_i r]$ included in the checksum C, wherein correctness is verified when [δ]=[Ø]−[ψ]=0 in all of the arithmetic devices connected to the network, [δ] being calculated separately and shared among all of the arithmetic devices connected to the network; and outputting the function value $[F([a_0], \ldots, [a_{M-1}])]$ when the correctness of the function value $[F([a_0], \ldots, [a_{M-1}])]$ is verified, and output an indication that falsification has occurred at one of the arithmetic devices connected to the network when the correctness of the function value $[F([a_0], \ldots, [a_{M-1}])]$ is not verified.

8. A non-transitory computer readable medium including computer executable instructions that make an arithmetic device, in a system that includes at least three arithmetic devices that are connected to a common network, perform a method, wherein M is integer equal to or larger than 1; m and i are integers equal to or larger than 0; 0≤m<M is satisfied; R is a ring; A is an associative algebra on R; [x] denotes a shared value of a value x∈R held by each of the arithmetic devices; <x>:=([x], [xr]) denotes a randomized shared value of a value x∈R which is a pair of a shared value of the value x and a shared value of an integrated value of the value x and a random value r∈A held by each of the arithmetic devices; μ is the number of elements included in a checksum C; and 0≤i<μ is satisfied, the method comprising:

generating a shared value [r] obtained by performing secret sharing of a random number r∈A, wherein each random number r∈A is generated separately in each arithmetic device as $r_n$ while being shared with each remaining arithmetic device as shared value $[r_n]$ to conceal the original value $r_n$ generated in each unit, and each arithmetic device calculates the same shared value [r] based on a summation of the all shared values $[r_n]$ shared among the arithmetic devices;

receiving a shared value $[a_0], \ldots, [a_{M-1}]$ as an input obtained by performing secret sharing of a value $a_0, \ldots, a_{M-1} \in R$ and use the shared value $[a_0], \ldots, [a_{M-1}]$ and the shared value [r] to compute a shared value $[a_0 r], \ldots, [a_{M-1} r]$ based on $[a_m r]=[a_m] \times [r]$, which represents an integrated value $a_0 r, \ldots, a_{M-1} r$ of the value $a_0, \ldots, a_{M-1}$ and the random number r and generate a randomized shared value $<a_0>, \ldots, <a_{M-1}>$ with the shared value $[a_0], \ldots, [a_{M-1}]$ and the shared value $[a_0 r], \ldots, [a_{M-1} r]$ as a pair based on $<a_m>=([a_m],[a_m r])$;

generating a concealed function value $[F([a_0], \ldots, [a_{M-1}])]$ by executing a function F including at least one secret operation for the randomized share value $<a_0>, \ldots, <a_{M-1}>$ while including a randomized shared value $<f_i>:=([f_i], [f_i r])$ which is an operation target and an operation result depending on the contents of secret computation of the secret operation upon $<a_0>, \ldots, <a_{M-1}>$, which is then input into the checksum $C:=<f_0>, \ldots, <f_{\mu-1}>:=([f_0], [f_0 r]), \ldots, ([f_{\mu-1}], [f_{\mu-1} r])$, wherein the circuitry of each arithmetic device includes a secret computation section which receives an input of the randomized shared value and which includes a plurality of separate and different mathematical operation portions, wherein the at least one secret operation is one of the plurality of separate and different mathematical operation portions that is selected within the respective arithmetic device;

verifying correctness of the function value $[F([a_0], \ldots, [a_{M-1}])]$ on the basis of a shared value [Ø] obtained by multiplying a sum total of shared values $[f_i]$ included in the checksum C by the shared value [r] and a shared value [ψ] which is a sum total of shared values $[f_i r]$ included in the checksum C, wherein correctness is verified when [δ]=[Ø]−[ψ]=0 in all of the arithmetic devices connected to the network, [δ] being calculated separately and shared among all of the arithmetic devices connected to the network; and outputting the function value $[F([a_0], \ldots, [a_{M-1}])]$ when the correctness of the function value $[F([a_0], \ldots, [a_{M-1}])]$ is verified, and output an indication that falsification has occurred at one of the arithmetic devices connected to the network when the correctness of the function value $[F([a_0], \ldots, [a_{M-1}])]$ is not verified.

* * * * *